Aug. 3, 1965

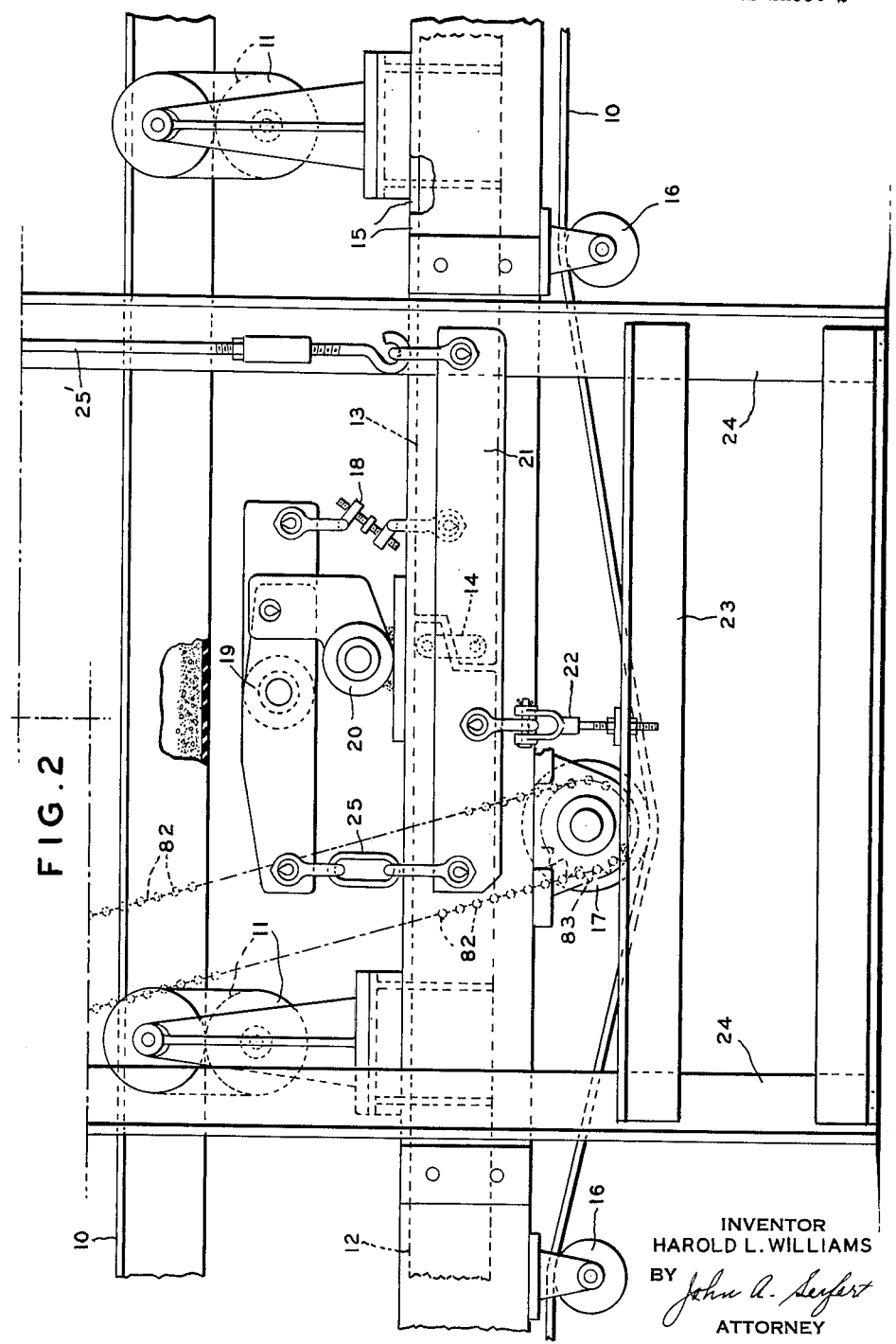

H. L. WILLIAMS 3,198,429

INTEGRATING MEANS

Filed Aug. 19, 1963

INVENTOR
HAROLD L. WILLIAMS
BY *John A. Seifert*
ATTORNEY

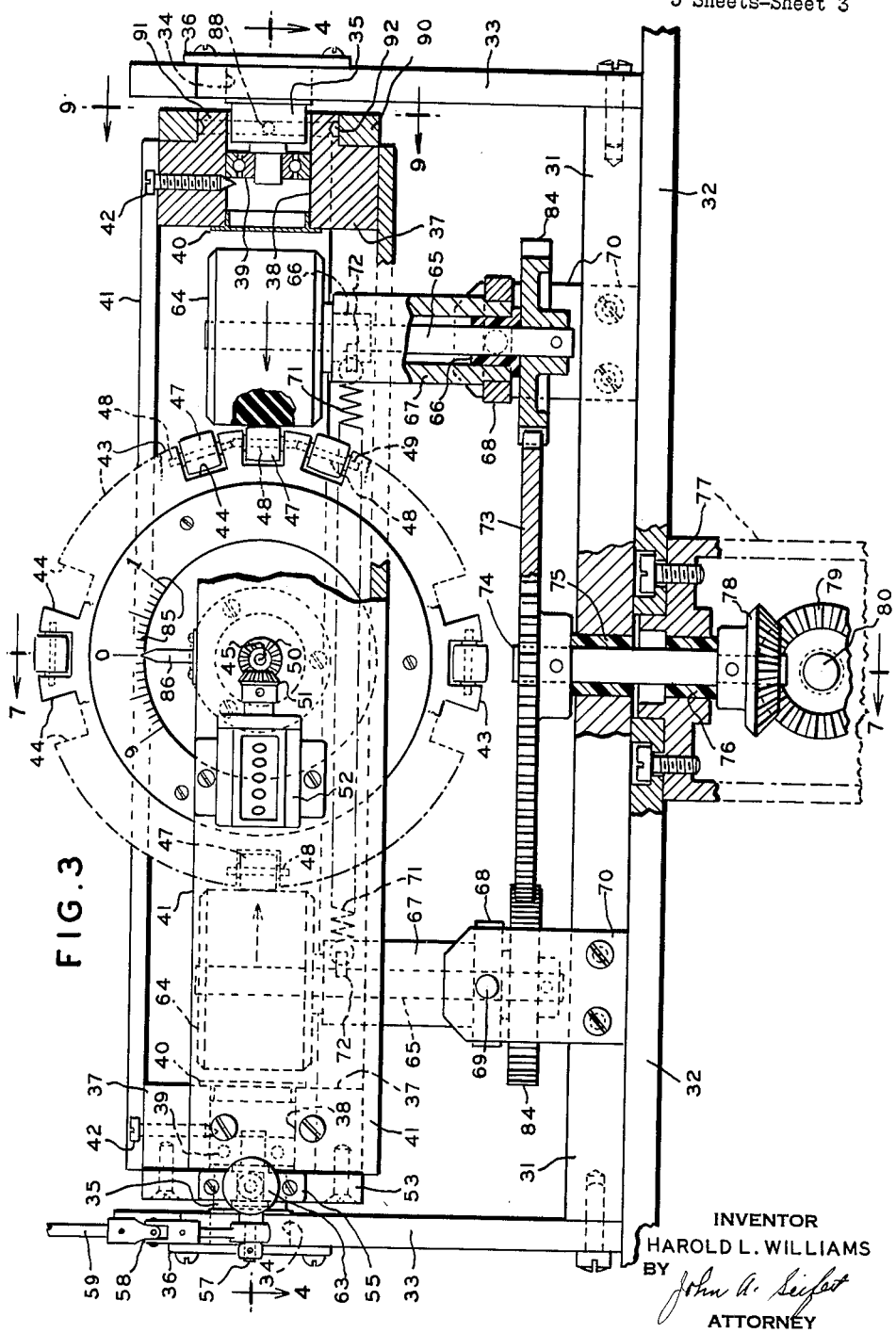

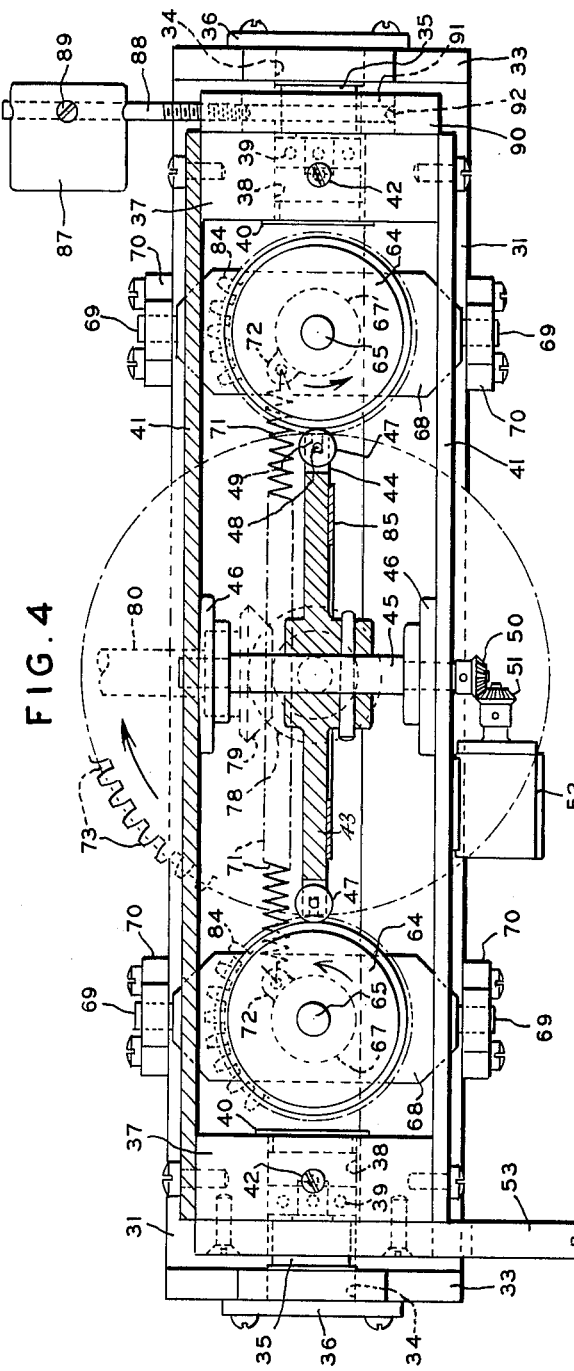
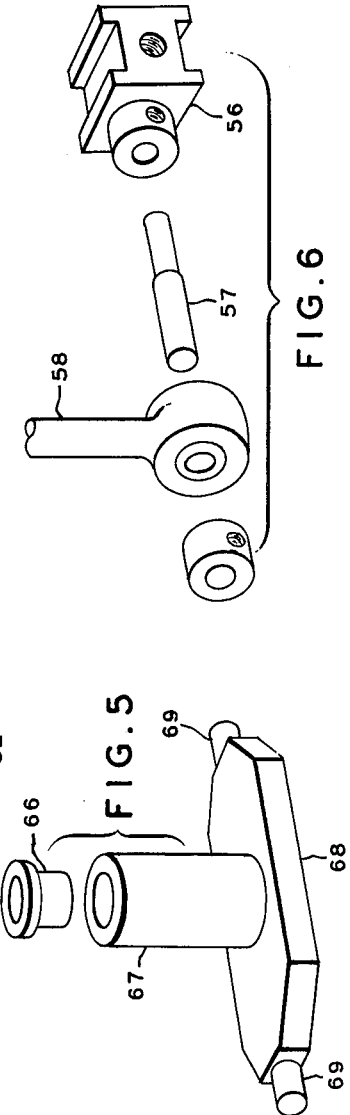
FIG. 4
FIG. 5
FIG. 6
INVENTOR
HAROLD L. WILLIAMS
BY John A. Seifert
ATTORNEY

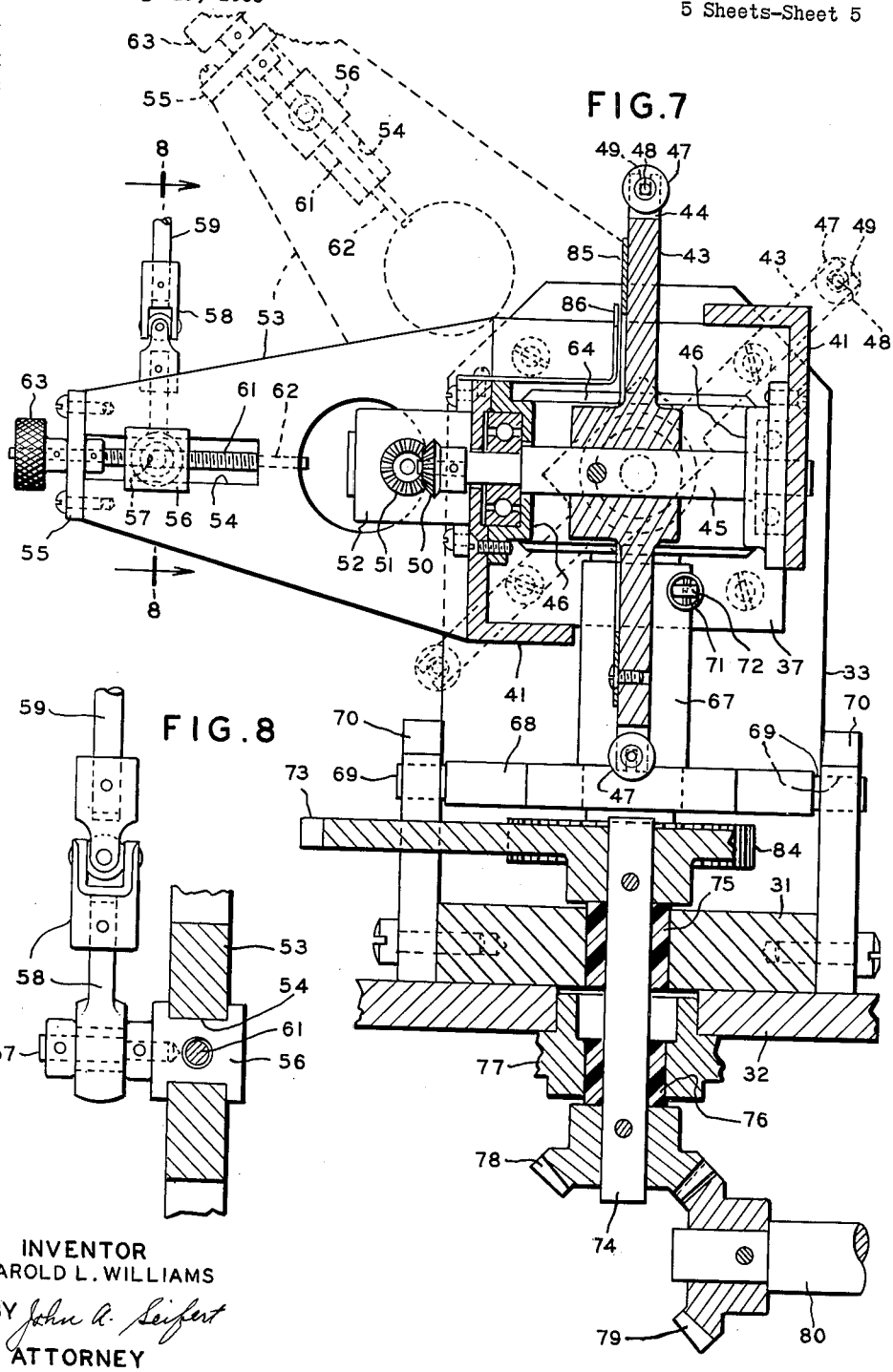

United States Patent Office 3,198,429
Patented Aug. 3, 1965

3,198,429
INTEGRATING MEANS
Harold L. Williams, Pearl River, N.Y., assignor to Merrick Scale Mfg. Company, Passaic, N.J., a corporation of New Jersey
Filed Aug. 19, 1963, Ser. No. 302,837
11 Claims. (Cl. 235—61)

This invention relates to means for integrating two variables, such as a load on a traveling conveyor, and particularly to an improvement of the integrating means described and claimed in Patent No. 954,870 issued April 12, 1910 to Herbert L. Merrick.

It is an object of this invention to reduce the size and cost of manufacture and maintenance by eliminating the endless belt and pulleys used in Patent No. 954,870. It was found that the endless belt and pulleys of Patent No. 954,870 could not accurately integrate unless take-up and pressure rollers were used as shown in Patent No. 1,875,485 issued September 6, 1932 to Yoshinobu Okada. This invention also eliminates the take-up and pressure rollers.

In the use of a belt and pulleys with the essential take-up and pressure rollers, it is necessary to replace the belt frequently which is time consuming since the belt cannot be forced over the flanges of the pulleys. Also any uneven stretch of the belt will cause it to ride off the pulleys and pressure rollers. The belt has to be in perfect condition to produce accurate integration.

It is also an object of the invention to reduce the size of the integrator shown in the patent to Merrick to such a degree that the present invention only requires an integrator disk of a diameter of four inches compared with the integrator disk of a foot in diameter used in the device of the patent to Merrick.

Attempts have been made to reduce the size of the integrator by scaling the parts down but have proved to be unsuccessful.

It is another object of the invention to improve the sensitivity of the integrator by using contacts between two convex surfaces in place of the flat contacts between the pulleys and belt of the patent to Merrick.

Attempts have been made to replace the belt by a cylindrical rubber sleeve being contacted on the inside by a small diameter disk or by the use of a rubber coated cup to drive the integrator disk. Both of these attempts failed for the main reason that the amount of contact surface between the driving member and the integrator disk rollers increased thereby considerably decreasing the sensitivity of the integrator.

Other objects and advantages of the invention will be set forth in the detailed description of the invention.

In the drawings accompanying and forming a part of this application:

FIGURE 2 is a front elevational view of the lower portion of the conveyor scale extending from the line 2—2 of FIGURE 1 and showing the conveyor suspension;

FIGURE 3 is a front elevational view partly in section of an integrator forming the embodiment of the invention.

FIGURE 4 is a horizontal-sectional view taken on the 4—4 of FIGURE 3 looking in the direction of the arrows;

FIGURE 5 is a perspective view of a mount for a pressure roll with the parts of said mount separated;

FIGURE 6 is a perspective view of a connection between the integrator and a self-balancing beam with the parts of the connection separated;

FIGURE 7 is a vertical-sectional view, on an enlarged scale, taken on the line 7—7 of FIGURE 3 looking in the direction of the arrows;

FIGURE 8 is a vertical-sectional view, on an enlarged scale, taken on the line 8—8 of FIGURE 7 looking in the direction of the arrows and showing the connection shown in FIGURE 6.

Figure 9:
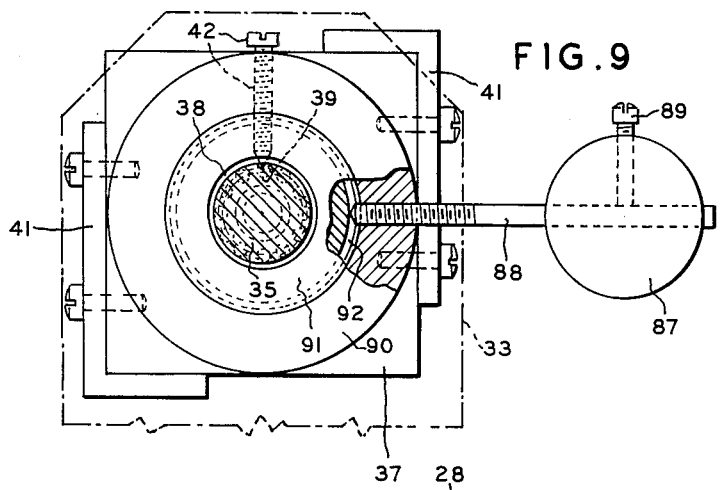
FIGURE 9 is an end view, on an enlarged scale, looking from the line 9—9 of FIGURE 3 in the direction of the arrows with a bearing support and part of an integrator disk frame in section.

The integrator forming the embodiment of this invention is shown with a conveyor scale comprising an endless conveyor belt 10 having a portion of the upper stretch supported by idlers 11 mounted on suspension frame sections 12 and 13 pivotally connected together by a link 14, as shown in broken lines in FIGURE 2, and said suspension frame sections are supported between stringers 15, as shown and described in application for patent Serial No. 253,213 filed January 22, 1963 by John L. Christmann now Patent No. 3,133,605. The lower stretch of the conveyor belt 10 travels over idlers 16 and under a tension idler 17, both idlers 16 and 17 being mounted on the bottoms of the stringers 15, as shown in FIGURE 2.

Figure 1:
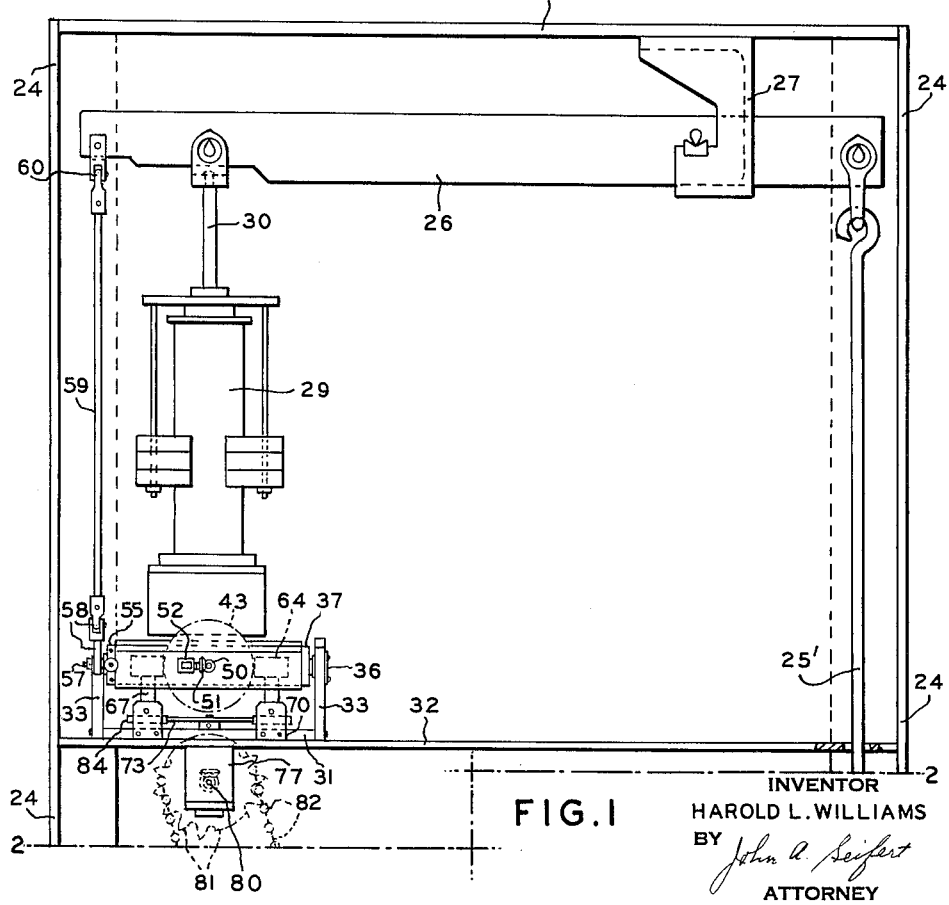
FIGURE 1 is a front elevational view of the upper portion of a conveyor scale showing the invention embodied therein.

The suspension frame sections 12 and 13 are connected by adjustable links 18 to a main lever 19 supported by a transverse member 20 secured at the ends to the stringers 15. An intermediate lever 21 is fulcrumed at 22 from a cross member 23 of standards 24 and connected at one end by a link 25 to one side of the main lever 19, as fully shown and described in application Serial No. 253,213. The opposite end of the intermediate lever 21 is connected by a link 25′ to a self-balancing beam 26 pivoted on a bracket 27 suspended by a cross member 28 at the tops of the standards 24, as shown in FIGURE 1. The movement of the beam 26 is controlled by a mercury pot and float 29 having a plunger 30 pivoted to the beam 26.

The integrator comprises a supporting structure including a horizontal base member 31 mounted on a cross member 32 of the standards 24 and vertical end members 33 secured to the opposite ends of the base member 31, as shown in FIGURES 1, 3, 4 and 7. The end members 33 of the supporting structure are provided with horizontally aligned openings 34 for the mounting of a stud 35 having four stepped diameter portions, the portion of greatest diameter being engaged in each of said openings 34 and arranged with a cap 36 abutting the outer face of each vertical member 33 of the supporting structure and secured to said vertical member, as shown in FIGURES 3 and 4.

A frame is pivotally mounted on the studs 35 and is provided with square members 37 having center circular openings 38 for engagement of a ball bearing 39 in each of said openings 38 and said ball bearing mounted on the smallest diameter portion of each stud 35. The inner end of each opening 38 is closed by a cap 40, as shown in FIGURE 3. The square end members 37 are connected together by side members 41 of angle shape in cross-section with one leg of each side member longer and said longer leg secured to a side of each end member 37, the side members 41 being secured to the opposite sides of the end members, as shown in FIGURES 7 and 9. The ball bearings 39 are retained on the smallest diameter portions of the studs 35 by a tapered end of screws 42 threaded in the end portions 37 with the tapered ends engaging the ball bearings 39, as shown in FIGURE 3.

There is provided an integrator disk 43 having equidistantly spaced recesses 44 in the peripheral portion and secured on a shaft 45 rotatably mounted in bearings 46 on the side members 41 of the frame midway of the end members 37 of said frame. A roller 47 is rotatably supported in each recess 44 of the integrator disk 43 by being rotatably mounted on a shaft 48 having the opposite ends projecting from the roller 47 and press fitted in slots 49 in the sides of the recess 44, as shown in FIGURES 3, 4 and 7. One end of the shaft 45 is extended from the outer face of one of the side members 41 constituting the front of the frame and provided with a beveled pinion 50 secured to said end and meshing with a beveled pinion 51 fixed on the shaft of a counter 52 mounted on said side member 41.

The integrator disk 43 is tilted from a vertical plane to an inclining plane in relation to a load on the portion of the conveyor belt 10 passing over the idlers 11. This is accomplished by an arm 53 secured at one end portion to one of the end members 37 and the opposite end portion of the arm extended in a horizontal plane when the integrator disk 43 is in a vertical plane and provided with a recess 54 having the open end closed by a plate 55 secured to the end of the arm 53. A block 56 is slidably mounted in the recess 54 and provided with a stud 57 pivotally connected to one end of a universal coupling 58 having the opposite end connected to one end of a link 59 having the opposite end connected to the self-balancing beam 26, as shown at 60 in FIGURE 1. The block 56 is adjusted in the recess 54 by an adjusting member in the form of a screw 61 having at one end a shank 62 rotatably supported in the arm 53 and the opposite end of the screw 61 rotatably mounted in the plate 55 and provided with a manipulating knob 63.

The integrator disk 43 and the shaft 45 are rotated in relation to the speed of travel of the conveyor belt 10 by a pair of rolls 64 of hard rubber, each roll being press-fitted on one end of a shaft 65 rotatably supported in bushings 66 in the opposite ends of a sleeve 67 having the lower end mounted in the center of a plate 68 having pintles 69 projecting from the opposite ends of the plate 68 and pivotally supported in brackets 70 fixed to and extended vertically from opposite edge portions of the base member 31. The brackets 70 are equidistantly spaced from the transverse center of the base member 31 so that the rolls 64 frictionally engage rollers 47 on diametrically opposite portions of the disk 43. The rolls 64 are yieldingly pivoted on the pintles 69 into frictional engagement with the rollers 47 by a spring 71 having the opposite ends anchored to lugs 72 fixed to and projecting from the sleeve 67. The speed of travel of the conveyor belt 10 is transmitted to the rolls 64 by a gear 73 fixed to one end of a shaft 74 rotatably mounted in bushings 75 and 76 in the base member 31 and a casing 77, respectively, said casing 77 being suspended from the cross-member 32. The opposite end of the shaft 74 is extended into the casing 77 and a beveled gear 78 is secured on said end of the shaft 74 in meshing engagement with a beveled gear 79 fixed on a shaft 80 supported by the casing 77 and extended from said casing. A sprocket wheel 81 is fixed on the extended portion of the shaft 80 and is engaged by a sprocket chain 82 engaged over a sprocket wheel 83 secured on the shaft of the idler 17, as shown in FIGURES 1 and 2. Diametrically opposite portions of the gear 73 are meshed with a pinion 84 secured on the end of each shaft 65 below the plate 68 and there is sufficient clearance between the meshing teeth to allow a small deflection of the rolls 64 toward and away from the rollers 47 to assure proper contact at all times between the rolls 64 and the rollers 47.

The front face of the integrator disk 43 is provided with graduations 85 movable relative to a pointer 86 mounted on the front side member 41, as shown in FIGURES 3 and 7.

The frame 37, 41 is balanced statically by a cylindrical balance weight 87 eccentrically and slidably mounted on a rod 88 and retained in adjusted position by a set-screw 89, as is shown in FIGURES 4 and 9. The rod 88 is screw-threaded in a ring 90 slidably mounted on a cylindrical extension 91 of the frame end member 37 opposite the frame end member 37 arranged with the arm 53. The extension 91 is provided with an annular groove 92 to receive the end of the screw-threaded portion of the rod 88 whereby the tightening of the rod 88 in the groove 92 will unite the ring 90 with the extension 91. The weight 87 on the rod 88 will impart sufficient torsional moment on said rod to maintain the ring 90 locked to the extension 91 due to the eccentric mounting of the weight 87 on the rod 88. A ninety degree turn of the weight 87 in a counter clockwise direction will unlock the ring 90 to allow angular adjustment, and the weight 87 is radially adjusted on the rod 88 by loosening the set-screw 89, whereby the frame 37, 41 can be easily balanced.

Having thus described my invention, I claim:

1. Means for integrating a variable load traveling at a variable speed, comprising a frame pivotally mounted on a horizontal axis to pivot in relation to the variable load, a disk rotatably supported by the frame on an axis extending perpendicularly to the axis of the frame, rollers rotatably mounted on the peripheral portion of the disk, and a pair of rolls rotatably mounted at diametrically opposite sides of the disk and in frictional contact with the rollers to rotate at a speed proportional to the variable speed, whereby the rotation of the rolls rotates the disk at a speed proportional to the product of the variable load and variable speed.

2. Means for integrating a variable load traveling at a variable speed as claimed in claim 1, wherein one end of the frame is provided with an axial extension arranged with an annular groove, a ring slidably mounted on the extension and encircling the groove, a rod adjustably and radially mounted in the ring to abut the groove and releasably lock the ring to the frame extension, and a balance weight eccentrically mounted on the rod to maintain the rod in locked position and releasably secured to the rod to be adjusted on the rod and statically balance the frame.

3. Means for integrating a variable load traveling at a variable speed as claimed in claim 2, wherein the end of the frame opposite the axial extension is provided with an arm arranged with a longitudinally extending recess, an adjusting member rotatably supported in the recess, and a block slidably mounted in the recess and operatively connected to the adjusting member and to the variable load.

4. Means for integrating a variable load traveling at a variable speed as claimed in claim 1, wherein the rolls are pivotally mounted on horizontal axes extending transversely of the axis of the frame, and said rolls yieldingly urged toward each other into frictional contact with the rollers.

5. Means for integrating a variable load traveling at a variable speed as claimed in claim 4, wherein the mounting of each roll comprises a sleeve pivotally supported on an axis extending transversely of the axis of the frame, and a shaft rotatably mounted in the sleeve with the opposite end portions of the shaft extending from the sleeve, one of said end portions carrying the roll and the opposite end portion being operatively connected to the variable speed.

6. Means for integrating a variable load traveling at a variable speed as claimed in claim 5, wherein each sleeve is provided with a plate extending transversely of the sleeve and having pintles projecting from the opposite ends and pivotally supported.

7. Means for integrating a variable load traveling at a variable speed as claimed in claim 1, wherein the rolls are of hard rubber to provide frictional contact between said rolls and the disk rollers.

8. Means for integrating a variable load traveling at a variable speed, comprising a supporting structure including a horizontal base member and vertical members secured to the opposite ends of the base member and arranged with horizontally aligned bearings spaced from the base member, a frame including a pair of end members pivotally mounted on the bearings of the supporting structure and a pair of side members connected at the opposite ends to the end members and having aligned bearings midway of the end members, means connected to the frame to pivot the frame in relation to the variable load, a disk rotatably supported by the bearings in the side members of the frame, rollers rotatably mounted in the peripheral portion of the disk, a pair of rolls rotatably mounted in vertical alignment with the longitudinal center of the base member of the supporting structure and pivotally supported by said base member of the supporting structure to frictionally contact the rollers on diametrically opposite portions of the disk, and means connected to the rolls to rotate said rolls at a speed proportional to the variable speed, whereby the rotation of the rolls rotates the disk at a speed proportional to the product of the variable load and variable speed.

9. Means for integrating a variable load traveling at a variable speed as claimed in claim 8, a pair of plates pivotally supported by the base member of the supporting structure to extend parallelly of the end members of the supporting structure and spaced equal distances from opposite sides of the transverse center of said base member, and a sleeve member supported in the center of each of said plates and rotatably supporting each of the rolls.

10. Means for integrating a variable load traveling at a variable speed as claimed in claim 9, a spring having the opposite ends connected to the sleeves to yieldingly urge the rolls into frictional contact with the rollers.

11. Means for integrating a variable load traveling at a variable speed as claimed in claim 10, a shaft rotatably mounted in each sleeve and having the opposite end portions projecting from the opposite ends of the sleeve, one projecting end portion of said shaft having one of the rolls fixed thereon, a pinion secured on the other projecting end portion of each of said shafts, and a gear rotatably supported in the center of the base member of the supporting structure in meshing engagement with the pinions and rotated at a speed proportional to the variable speed.

References Cited by the Examiner

UNITED STATES PATENTS

| | | | |
|---|---|---|---|
| 954,870 | 4/10 | Merrick | 235—61 |
| 1,875,485 | 9/32 | Okada | 177—16 |
| 2,285,675 | 6/42 | Merrick | 74—194 |
| 2,992,564 | 7/61 | Blik | 74—208 |
| 3,009,362 | 11/61 | Christmann | 74—198 |

LEO SMILOW, *Primary Examiner.*